(12) United States Patent  
Jackson (10) Patent No.: US 11,406,890 B1  
(45) Date of Patent: Aug. 9, 2022

(54) SKATEBOARD ASSEMBLY

(71) Applicant: David Jackson, Pennington, NJ (US)

(72) Inventor: David Jackson, Pennington, NJ (US)

( * ) Notice: Subject to any disclaimer, the term of this patent is extended or adjusted under 35 U.S.C. 154(b) by 0 days.

(21) Appl. No.: 16/124,192

(22) Filed: Sep. 7, 2018

Related U.S. Application Data

(60) Provisional application No. 62/550,239, filed on Aug. 25, 2017.

(51) Int. Cl.
*A63C 17/12* (2006.01)
*A63C 17/01* (2006.01)
*B60L 15/20* (2006.01)

(52) U.S. Cl.
CPC ............ *A63C 17/12* (2013.01); *A63C 17/011* (2013.01); *A63C 17/016* (2013.01); *B60L 15/20* (2013.01); *A63C 2203/12* (2013.01); *B60L 2200/00* (2013.01)

(58) Field of Classification Search
CPC ..... A63C 17/12; A63C 17/011; A63C 17/016; B60L 15/20
See application file for complete search history.

(56) References Cited

U.S. PATENT DOCUMENTS

| | | | |
|---|---|---|---|
| 525,270 A | 8/1894 | Kitchen | |
| 1,150,227 A | 8/1915 | Hies | |
| 1,241,607 A | 10/1917 | Bowen | |
| 3,876,217 A * | 4/1975 | Copier | B62K 3/10 280/11.225 |
| 4,094,372 A | 6/1978 | Notter | |
| 4,411,442 A | 10/1983 | Rills | |
| 4,445,699 A * | 5/1984 | Darasko | A63C 17/045 280/11.223 |
| 4,991,861 A * | 2/1991 | Carn | B62B 15/001 280/11.208 |
| 5,020,621 A | 6/1991 | Martin | |
| 5,046,747 A | 9/1991 | Nielsen | |
| 5,372,383 A | 12/1994 | Kubierschky | |
| 5,819,865 A | 10/1998 | Cowley | |
| 6,050,357 A | 4/2000 | Staelin et al. | |
| 6,074,271 A | 6/2000 | Derrah | |

(Continued)

FOREIGN PATENT DOCUMENTS

| | | |
|---|---|---|
| AU | 673428 B2 | 11/1996 |
| AU | 2011101426 A4 | 12/2011 |

(Continued)

*Primary Examiner* — Minnah L Seoh
*Assistant Examiner* — Michael R Stabley
(74) *Attorney, Agent, or Firm* — Law Office of Michael O'Brien; Michael O'Brien (57) ABSTRACT

A motorized or non-motorized multi-wheeled skateboard assembly including a board deck to support the user, a board having a top side, a bottom side, a flat and a rounded end, linkages, hinges, a steered wheel assembly, an input device and a drive assembly. The steered wheel assembly improves maneuverability, turn radius, and stability. The user steers the skateboard assembly by altering pressure between the top side first end and the top side second end causing the steered wheel to turn, thus manually steering the board. This change in pressure is also altered between the first linkage and second linkage in direct or inverse relation to altering pressure between the top side first end and the top side second end of the board deck.

15 Claims, 10 Drawing Sheets

(56) References Cited

U.S. PATENT DOCUMENTS

| | | | |
|---|---|---|---|
| 6,398,237 B1* | 6/2002 | Attey | A63C 17/01 280/87.042 |
| 6,705,630 B1 | 3/2004 | Karpman | |
| 6,726,523 B2 | 4/2004 | Baker et al. | |
| 6,848,527 B2 | 2/2005 | Nelson | |
| 7,073,805 B2 | 7/2006 | Yan | |
| 7,147,235 B2* | 12/2006 | West | A63C 17/013 280/87.042 |
| 7,669,681 B2 | 3/2010 | Lee | |
| 8,061,725 B1 | 11/2011 | Hawkins | |
| 8,376,378 B2* | 2/2013 | Keel | B62K 11/04 180/227 |
| 9,004,213 B2 | 4/2015 | Larson et al. | |
| 9,387,388 B2 | 7/2016 | King | |
| 9,393,483 B2 | 7/2016 | Tan et al. | |
| 9,673,432 B2 | 6/2017 | Tian | |
| 9,795,864 B1 | 10/2017 | Bao | |
| 9,975,035 B1 | 5/2018 | Wang | |
| 9,999,827 B2 | 6/2018 | Wood | |
| 2004/0065494 A1 | 4/2004 | Nelson | |
| 2004/0200651 A1 | 10/2004 | West | |
| 2005/0139406 A1 | 6/2005 | McLeese | |
| 2006/0032682 A1 | 2/2006 | Hillman et al. | |
| 2006/0049595 A1 | 3/2006 | Crigler et al. | |
| 2006/0170174 A1 | 8/2006 | Hiramatsu | |
| 2007/0262546 A1* | 11/2007 | Bertiller | A63C 17/014 280/87.042 |
| 2007/0272465 A1* | 11/2007 | Su | B60L 8/003 180/181 |
| 2008/0084034 A1 | 4/2008 | Feldman et al. | |
| 2009/0149112 A1 | 6/2009 | Clark, Jr. et al. | |
| 2010/0090424 A1 | 4/2010 | Cole | |
| 2010/0222941 A1 | 9/2010 | Chang | |
| 2011/0233891 A1 | 9/2011 | Prior et al. | |
| 2014/0332297 A1 | 11/2014 | Palacio | |
| 2016/0059108 A1 | 3/2016 | Demolder | |
| 2016/0303466 A1 | 10/2016 | King | |
| 2017/0056756 A1 | 3/2017 | Pikulski | |
| 2018/0104567 A1 | 4/2018 | Treadway et al. | |
| 2018/0147478 A1 | 5/2018 | Wood | |
| 2018/0185740 A1 | 7/2018 | De Minicis et al. | |
| 2018/0193724 A1 | 7/2018 | King | |

FOREIGN PATENT DOCUMENTS

| | | |
|---|---|---|
| AU | 2013216719 A1 | 9/2014 |
| AU | 2013216719 B2 | 2/2017 |
| AU | 2017100681 A4 | 7/2017 |
| AU | 2017203648 A1 | 4/2018 |
| CN | 2392572 Y | 8/2000 |
| CN | 2392573 Y | 8/2000 |
| CN | 2446036 Y | 9/2001 |
| CN | 2451458 Y | 10/2001 |
| CN | 2626557 Y | 7/2004 |
| CN | 1167481 C | 9/2004 |
| CN | 2673465 Y | 1/2005 |
| CN | 2728574 Y | 9/2005 |
| CN | 201001953 Y | 1/2008 |
| CN | 100515810 C | 7/2009 |
| CN | 201516276 U | 6/2010 |
| CN | 1907528 B | 6/2011 |
| CN | 201848083 U | 6/2011 |
| CN | 201880334 U | 6/2011 |
| CN | 201940001 U | 8/2011 |
| CN | 201980353 U | 9/2011 |
| CN | 202179839 U | 4/2012 |
| CN | 102458974 A | 5/2012 |
| CN | 202376728 U | 8/2012 |
| CN | 202751772 U | 2/2013 |
| CN | 202806993 U | 3/2013 |
| CN | 103111068 A | 5/2013 |
| CN | 202933467 U | 5/2013 |
| CN | 202983143 U | 6/2013 |
| CN | 102430238 B | 7/2013 |
| CN | 203342326 U | 12/2013 |
| CN | 203694569 U | 7/2014 |
| CN | 204050915 U | 12/2014 |
| CN | 204073354 U | 1/2015 |
| CN | 204092999 U | 1/2015 |
| CN | 204895720 U | 12/2015 |
| CN | 105311819 A | 2/2016 |
| CN | 105327500 A | 2/2016 |
| CN | 105536236 A | 5/2016 |
| CN | 105727547 A | 7/2016 |
| CN | 105833513 A | 8/2016 |
| CN | 105854273 A | 8/2016 |
| CN | 105879365 A | 8/2016 |
| CN | 205516395 U | 8/2016 |
| CN | 106005197 A | 10/2016 |
| CN | 106255536 A | 12/2016 |
| CN | 106492446 A | 3/2017 |
| CN | 106621295 A | 5/2017 |
| CN | 107215422 A | 9/2017 |
| CN | 107261472 A | 10/2017 |
| CN | 107303431 A | 10/2017 |
| CN | 206605185 U | 11/2017 |
| CN | 105169687 B | 12/2017 |
| CN | 105817022 B | 12/2017 |
| CN | 105879365 B | 1/2018 |
| CN | 108014485 A | 5/2018 |
| CN | 207429643 U | 6/2018 |
| DE | 9317044 U1 | 1/1994 |
| DE | 4426337 A1 | 2/1995 |
| DE | 4441642 A1 | 4/1995 |
| DE | 19803412 A1 | 8/1999 |
| DE | 10001719 C2 | 3/2002 |
| DE | 10107291 A1 | 8/2002 |
| DE | 10214510 A1 | 10/2003 |
| DE | 20308409 U1 | 10/2003 |
| DE | 102004019581 A1 | 11/2005 |
| DE | 69834427 T2 | 4/2007 |
| DE | 102009036924 A1 | 2/2011 |
| ES | 1004761 U | 10/1988 |
| ES | 1055076 U | 10/2003 |
| ES | 2264813 T3 | 1/2007 |
| ES | 1139034 Y | 8/2015 |
| ES | 2640054 T3 | 10/2017 |
| FR | 429894 A | 10/1911 |
| FR | 1200727 A | 12/1959 |
| FR | 2434637 A1 | 3/1980 |
| FR | 2653348 A1 | 4/1991 |
| FR | 2675703 A1 | 10/1992 |
| FR | 2675703 B1 | 10/1994 |
| FR | 2810895 B1 | 9/2002 |
| FR | 2855978 A1 | 12/2004 |
| FR | 2941666 A1 | 8/2010 |
| FR | 2941666 B1 | 7/2012 |
| FR | 3040140 A1 | 2/2017 |
| FR | 3046548 B1 | 1/2018 |
| GB | 2393663 A | 4/2004 |
| GB | 2393663 B | 5/2006 |
| GB | 2464565 A | 4/2010 |
| GB | 2464676 A | 4/2010 |
| JP | 06080468 U | 11/1994 |
| JP | 06312041 A | 11/1994 |
| JP | 10023613 A | 1/1998 |
| JP | 10314366 A | 12/1998 |
| JP | 2004166982 A | 6/2004 |
| JP | 2005137786 A | 6/2005 |
| JP | 2006217952 A | 8/2006 |
| JP | 2011118590 A | 6/2011 |
| JP | 2016533255 A | 10/2016 |
| KR | 1020070114255 A | 11/2007 |
| KR | 100934776 B1 | 12/2009 |
| KR | 101407919 B1 | 5/2014 |
| KR | 1020160067357 A | 6/2016 |
| KR | 1020180001773 A | 1/2018 |
| KR | 1020180002481 A | 1/2018 |
| KR | 1020180085955 A | 7/2018 |
| WO | 9955436 A1 | 11/1999 |
| WO | 2004067121 A1 | 8/2004 |
| WO | 2004073810 A1 | 9/2004 |
| WO | 2004062757 A3 | 8/2005 |

(56) References Cited

FOREIGN PATENT DOCUMENTS

| | | |
|---|---|---|
| WO | 2007042773 A3 | 7/2007 |
| WO | 2007113340 A1 | 10/2007 |
| WO | 2013120102 A2 | 8/2013 |
| WO | 2013166731 A1 | 11/2013 |
| WO | 2014108275 A3 | 10/2014 |
| WO | 2013120102 A3 | 12/2014 |
| WO | 2015198360 A1 | 12/2015 |
| WO | 2016207062 A1 | 12/2016 |
| WO | 2017152536 A1 | 9/2017 |
| WO | 2018120534 A1 | 7/2018 |

\* cited by examiner

SKATEBOARD ASSEMBLY

RELATED APPLICATION

This application claims priority to provisional patent application U.S. Ser. No. 62/550,239 filed on Aug. 25, 2017, the entire contents of which is herein incorporated by reference.

BACKGROUND

In vehicles with wheels or any sort of wheelbase or track width, there is often a trade-off between speed and maneuverability. For example, automobiles are often associated with a minimum turning radius which increases as the speed of the vehicle increases. Since their debut in the 20th century, skateboards have been evolving. A lot of innovation took place around the performance or aesthetics of skateboards, introducing high-speed electric skateboards or designer skateboards. However, the overall structure of a skateboard has remained stagnant. Especially, the wheel structure of a skateboard has barely changed. The current state of the art for steering vehicles that lean into turns is some form of physical pivot axis, around which the wheel that is being steered can rotate, generally orthogonal to the axle of that wheel. The majority of high-speed skateboards available in the current market still comprise four wheels, despite the fact that those wheels substantially restrict the radius of steering. Such skateboards hinder users from making a sharp turn, and doing so becomes increasingly hard at a high speed. Moreover, traditional four-wheel skateboards are not suitable for riding on a rugged terrain due to the limited size of their wheels. Small wheels do not effectively absorb shocks from bumps and often get stuck in small dents. Therefore, the surfaces that skateboards can operate on have been limited substantially.

In the case of skateboard systems, it can be challenging to balance the right amount of maneuverability over a range of speeds. In cases where the system is moving at slow speeds, it is often desired that the system is more maneuverable in order to make tighter turns. However, in cases where the system is moving at high speeds, too much maneuverability will make the system overly-sensitive to user input and develop what is often referred to as a "speed wobble" in which the system begins to oscillate back and forth from relatively small amounts of user input at high speeds.

SUMMARY

The present invention disclosure a skateboard assembly, configured to be self-propelled and manually steered. The novel invention addresses a skateboard more easily controlled and freely steered. In one embodiment, the motorized includes a board having a top and bottom side, a flat and a rounded end, a steering wheel assembly, a driven wheel assembly, a steering wheel assembly is joined to the board, a first linkage, a second linkage, a steered wheel, a steered wheel bracket, and a steered tire. In some embodiments, the driven wheel assembly is configured to include: a driven wheel, a driven tire, a gear attached to the wheel, and a drive assembly attached to the gear. The board may be configured to attach the first linkage and second linkage to either the top or bottom side of the board. The board may be made of various materials, including multi-ply wooden skateboard deck. An opening may be located anywhere on the board or proximate to the rounded end between the top and bottom side, wherein the driven wheel assembly may be arranged. The board may also be made of a metal, wood, a composite material, structural tubing, a rigid platform or any combination thereof. The skateboard assembly is configured to withhold the weight of a human being and when configured properly the multi-ply wooden skateboard deck has a structurally significant portion of the board retained at the rounded end directly behind the driven wheel to maintain torsional stiffness of the multi-ply wooden skateboard deck for mounting the driven wheel.

The present disclosure and some embodiments are also directed to a drive assembly including a motor, gearing, a chain and a battery attached to the motor. The skateboard assembly motor can be powered by various electrical battery storage means including a lithium-ion battery, a nickel metal hydride battery, a nickel-cadmium cell battery, capacitor energy storage pack, a mechanical energy storage or any combination thereof. The skateboard assembly may include motorized means in the way of an internal combustion engine. The brackets of the skateboard assembly may include designs wherein the brackets are cantilevered off the rounded end of the board. The skateboard assembly may also include a series of beams including a first and second beam. The first beam may be directed to or attached to the bottom side and to the top side first end hinge through the board. The second beam is may be directed to or attached to the bottom side and to the top side second end hinge through the board. The present disclosure includes the skateboard assembly beams providing additional support to the first and second linkage. The drive assembly is attached to the gear in various embodiments including: a chain, a belt, and a hub motor.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable skateboard assembly.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
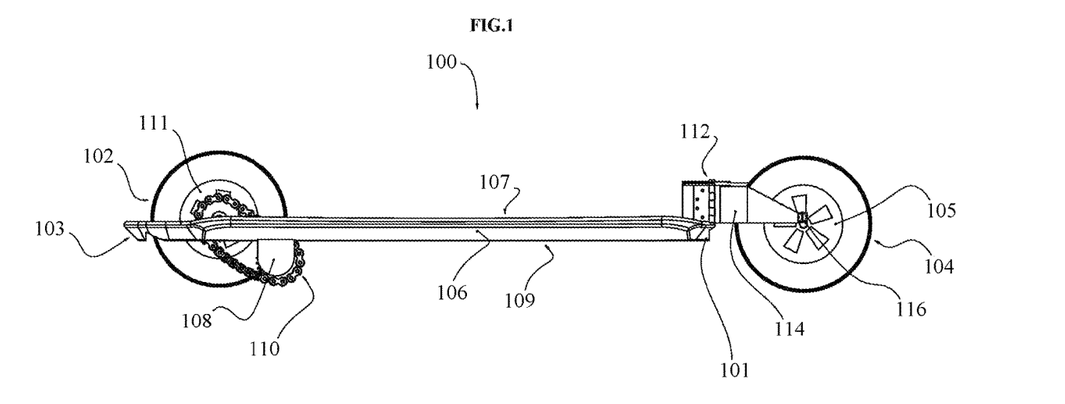
FIG. 1 shows an exemplary left perspective view of one embodiment of the skateboard assembly.

With reference to FIG. 1, the skateboard assembly 100 is shown in exemplary form from a left view perspective. In the current embodiment, the board 106 is a fixed structure on which the user will place weight of the user when interacting with the skateboard assembly. The board 106 has a top side 107, a bottom side 109, a flat end 101 and a rounded end 103. The steering wheel assembly, in some embodiments, may consist of: a first linkage 114 joined to a top side 107 first end with a top side first end 121 hinge 112, a second linkage 115 joined to a top side 107 second end 123 with a top side 107 second end hinge 112, a steered wheel 104, a steered tire 105, a steered wheel bracket 128 wherein the spring 126 attaches to, a driven wheel 102, a driven tire 111, a gear 110 attached to the driven wheel 102 or any combination thereof. In some embodiments the steering assembly may be mounted to the rounded end 103 or the flat end 101. The steering wheel 104 of the steering wheel assembly controls the direction of movement taken by the skateboard assembly. In some embodiments, the steered wheel 104 is attached to both the first linkage 114 and second linkage 115, wherein altering pressure between the top side first end 121 and the top side second end 123 causes the steered wheel to turn, thus manually steering the board. This change in pressure is also altered between the first linkage 114 and second linkage 115 in direct or inverse relation to altering pressure between the top side 107 first end 121 and the top side 107 second end 123. The main hinges 112 connect to both the first linkage 114 and second linkage 115 allowing for articulation of the first linkage 114 and the second linkage 115 in the left and right direction, inversely or respectively. The main hinges 112 are then secured to the board by at least one mounting bracket 120. In some embodiments, the mounting brackets 120 are attached to the board 106 on the top side 107, bottom side 109 or any combination thereof. In various embodiments, the mounting bracket 120 may be a separate member or part of the board 106, and may be made of wood, structural tubing, a rigid platform, metals, plastics, composites, multi-ply wood, carbon fiber, other rigid materials or any combination thereof. The secondary hinges 116 connect the supporting member or axle of the steering wheel 105 and allow for further articulation of the first linkage 114 and the second linkage 115. In some embodiments, the first linkage 114 and the second linkage 115 are cantilevered off the rounded end of the board.

In some embodiments, the skateboard assembly may comprise at least one beam attached to the board 106 on the top side 107, bottom side 109 or any combination thereof, in which the beam structurally attaches to the board 106 or mounting brackets 112. In some embodiments, the beams provide additional structural support to the first linkage 114 and the second linkage 115 from the induced load or forces of the user or riding conditions.

Figure 3:
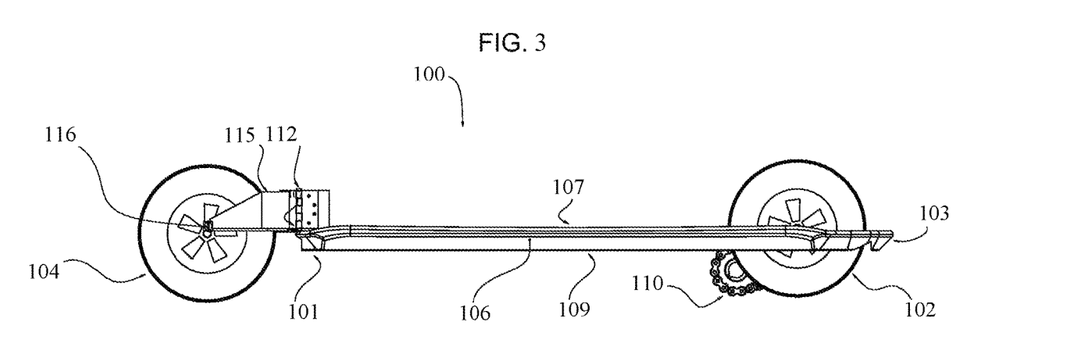
FIG. 3 shows an exemplary right perspective view of one embodiment of the skateboard assembly.

In some embodiments, the gear 110 connected to the driven wheel 102 may be a single gear, gearbox, range of gears, or plurality of gears. The drive assembly 108, in the current exemplary embodiment, is shown as an electric motor driving the gear 110 and consequently the driven wheel 102. FIG. 3 shows an exemplary embodiment from a right view perspective. In some embodiments, the gear 110 or drive assembly 108 may be mounted to the skateboard assembly on the top side 107 or the bottom side 109.

Figure 4:
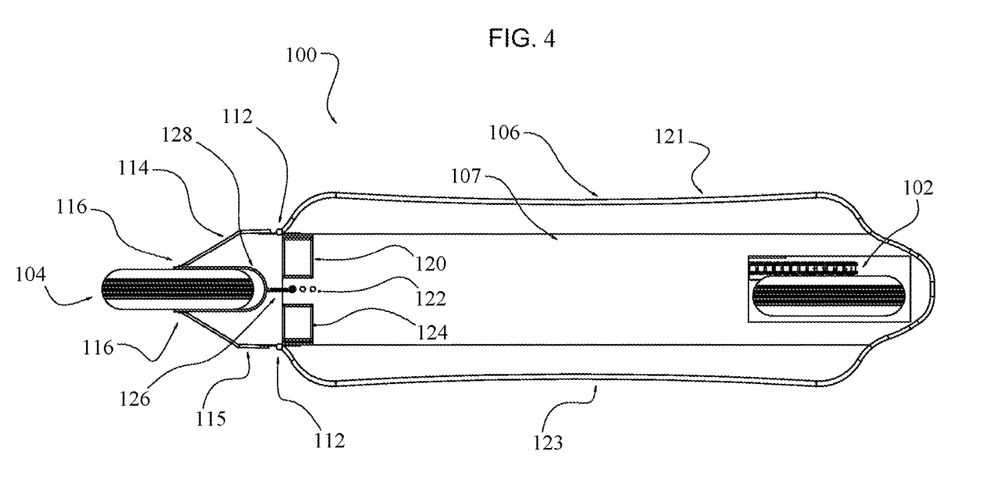
FIG. 4 shows a top view of an exemplary embodiment of the skateboard assembly.

In a top view of an exemplary embodiment, FIG. 4 shows the skateboard assembly. In the current exemplary embodiment, the mounting brackets 120 are shown on the flat end 101 of the board 106. In some embodiments, adjustable mounting positions 122 for the spring 126 are shown to alter the retracting or spring force of the spring 126. Then, from this change in spring tension, retraction force or spring force the steering wheel 111 will return to parallel with the board at different rates or speeds. In some embodiments, this action of returning to may be dampened or slowed down by gas shocks, springs, air shocks, other dampening means or any combination thereof. The steering wheel 111 is connected to the board by the steered wheel bracket 128 attached to the spring 126. Then, the spring 126 is attached at the adjustable mounting positions 122.

Figure 5:
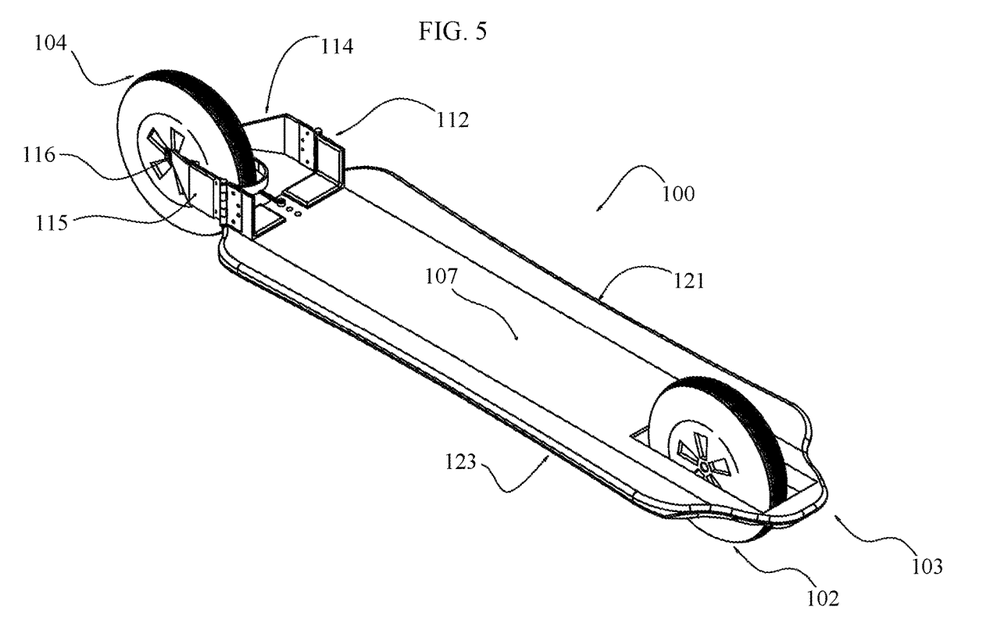
FIG. 5 shows a isometric view of an exemplary embodiment of the skateboard assembly.

FIG. 5 illustrates the skateboard in exemplary form from an isometric view. In some embodiments, the board 106 can have various surface finishes and textures to aide in the shifting pressure on any portions of the board 106.

Figure 6:
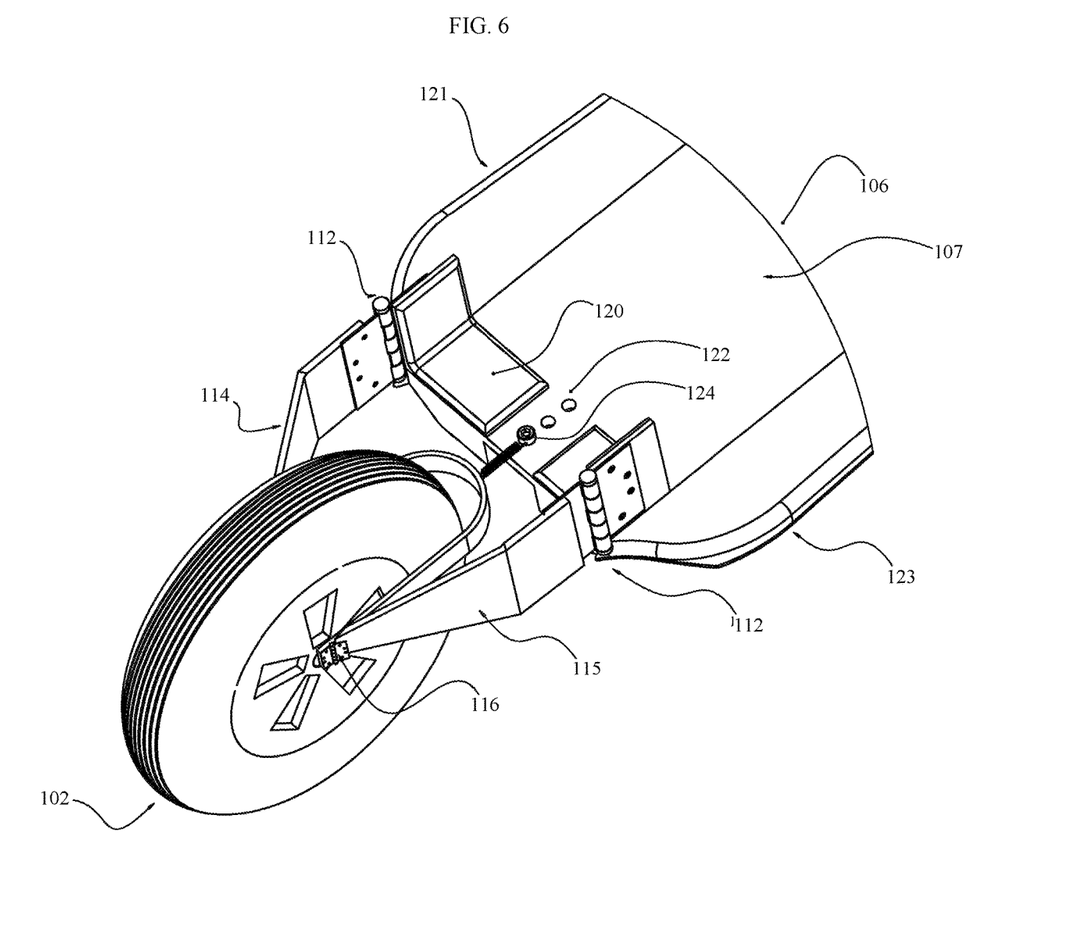
FIG. 6 shows a detail view of the exemplary steering wheel assembly of the skateboard assembly.

FIG. 6 detail view of the exemplary steering wheel assembly of the skateboard assembly 100. In some embodiments, the steered wheel bracket may be any shape connected to either side of the steered wheel 111. In the current embodiment shown in FIG. 6 the steered wheel bracket 128 not only serves as a connection point for the spring 126, but also keeps the steered tire 102 from rubbing or touching the first linkage 114 or the second linkage 115, and consequently slowing down the entire skateboard assembly 100 and user. FIG. 6 also shows an exemplary opening that may be located anywhere on the board 106 or proximate to the rounded end 103 between the top 107 and bottom side 109, wherein the driven wheel assembly may be arranged.

Figure 2:
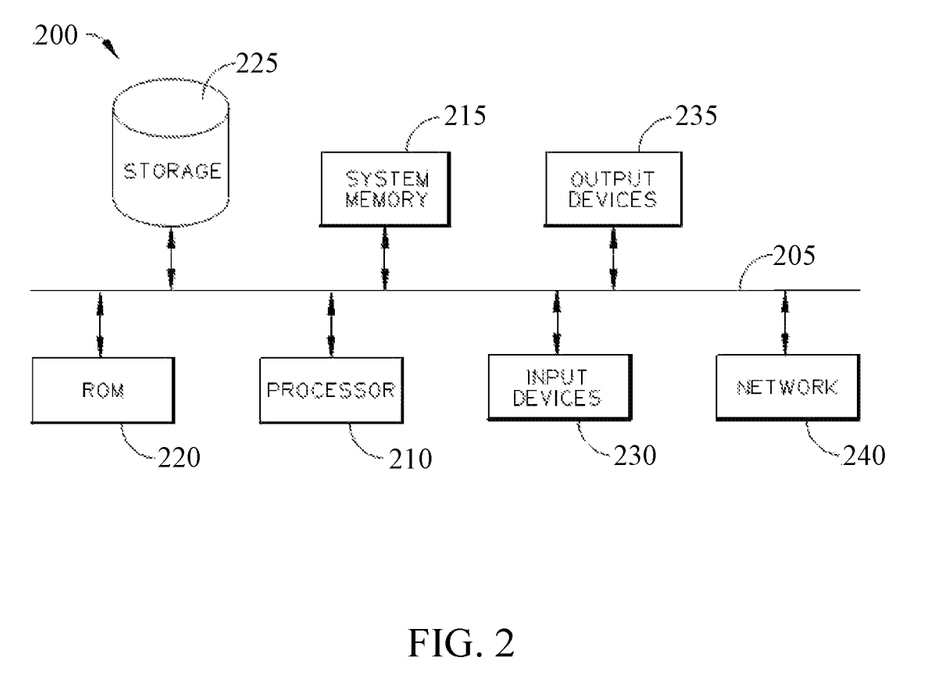
FIG. 2 shows a schematic of an exemplary schematic view of a computer system control system for the skateboard assembly.
Figure 7:
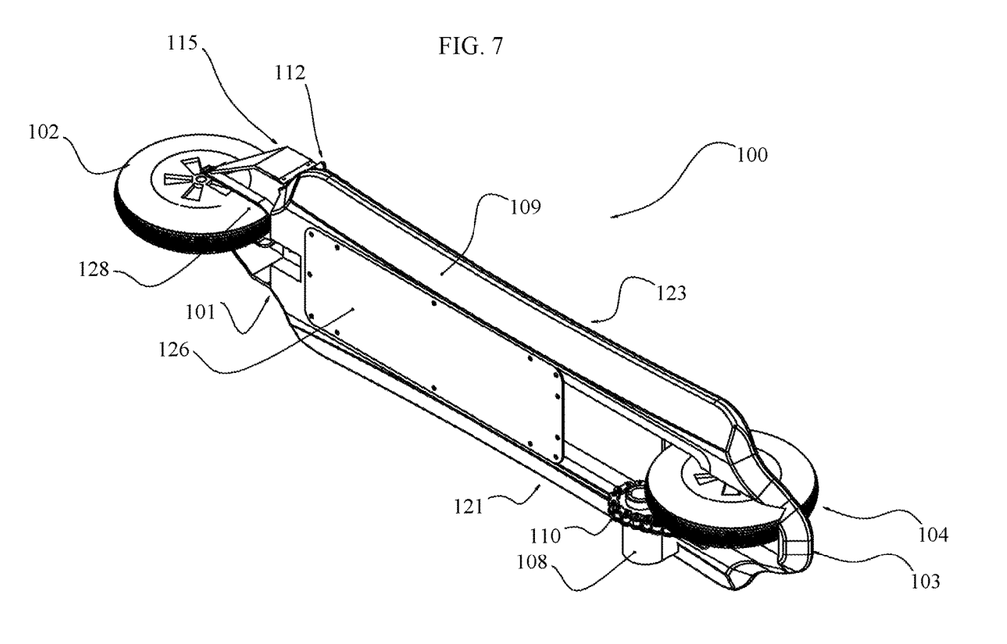
FIG. 7 shows an isometric view of the bottom an exemplary embodiment of the skateboard assembly.

In an exemplary design, FIG. 7 shows the bottom side 109 of the skateboard assembly 100. In some embodiments, the drive assembly and electronic system 200 shown in FIG. 2 are mounted and shown herein in exemplary form in FIG. 7 on the bottom side 109 of the board 106. The drive assembly in some embodiments may be, but is not limited to in any way, an internal combustion motor, electrical power bank, battery, brushless motor, brushed motor. The drive assembly motor 108 may be in some embodiments connected by gear, a plurality of gears, chain, any shape of belt or hub motor. The drive assembly 126 battery of the current exemplary embodiment is shown as an electrical battery, the battery is in no way limited to, but may consist of the following battery types: a lithium-ion battery, a nickel metal hydride battery, a nickel-cadmium cell battery, capacitor energy storage pack, and a mechanical energy storage. The drive assembly 126 may be controlled by an input device and in some embodiments may control: the amperage, voltage, gear, polarity, PWM (pulse wave manipulation) any digital aspect or combination thereof of the drive assembly consisting of the motors 108 or the battery 126. In some embodiments, the input device is a pointing device including, by way of non-limiting examples, a mouse, RC controller, handheld remote, watch, mobile cellular device, computer, Bluetooth device, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion, gesture or visual input. In still further embodiments, the input device is a combination of devices such as those disclosed herein.

Figure 8:
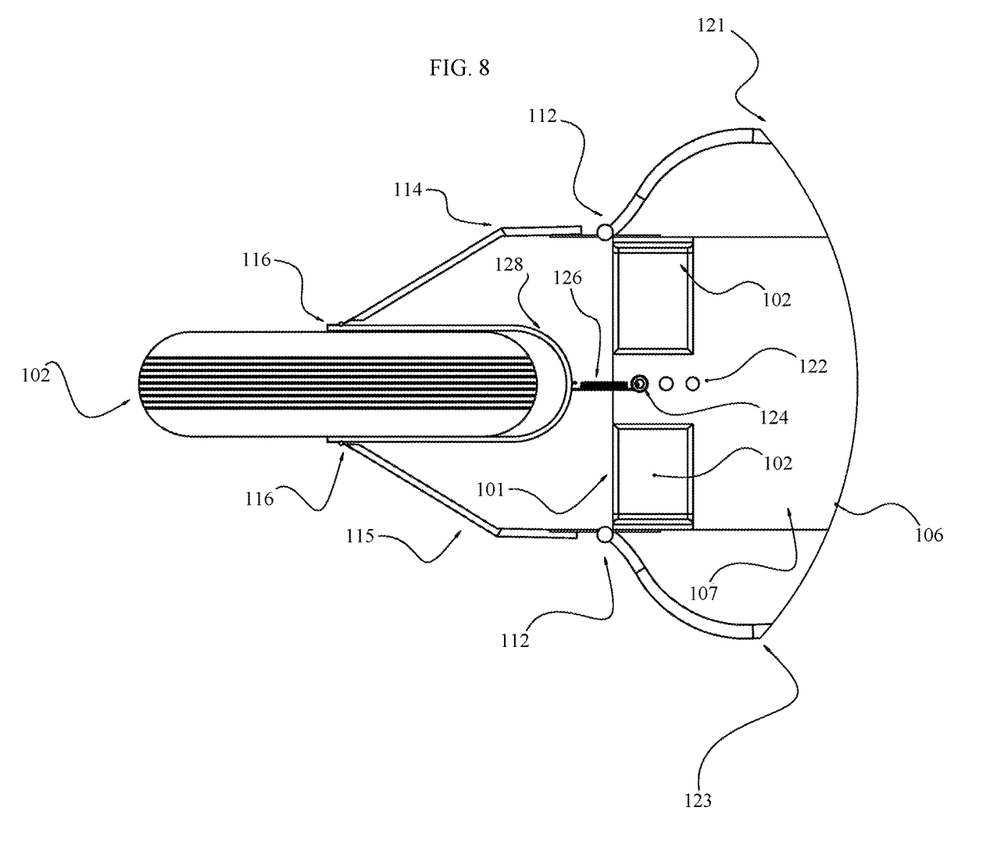
FIG. 8 illustrates a detail top view of an exemplary embodiment of the steering wheel assembly of the skateboard assembly.

FIG. 8 shows the exemplary top view of the skateboard assembly 100 and the steered wheel assembly. Further embodiments may not be limited to two mounting brackets 120 and may consist of a plurality of mounting brackets 120. Further embodiments, may consist of more than the first linkage 114 and second linkage 115, these embodiments may include a plurality of linkages attached to the steered wheel assembly. In some embodiments, the skateboard assembly may have a plurality of the following: a steered wheels 104, a steered tires 105, a steered wheel brackets 128, springs 126, driven wheels 102, or driven tires 111.

Figure 9:
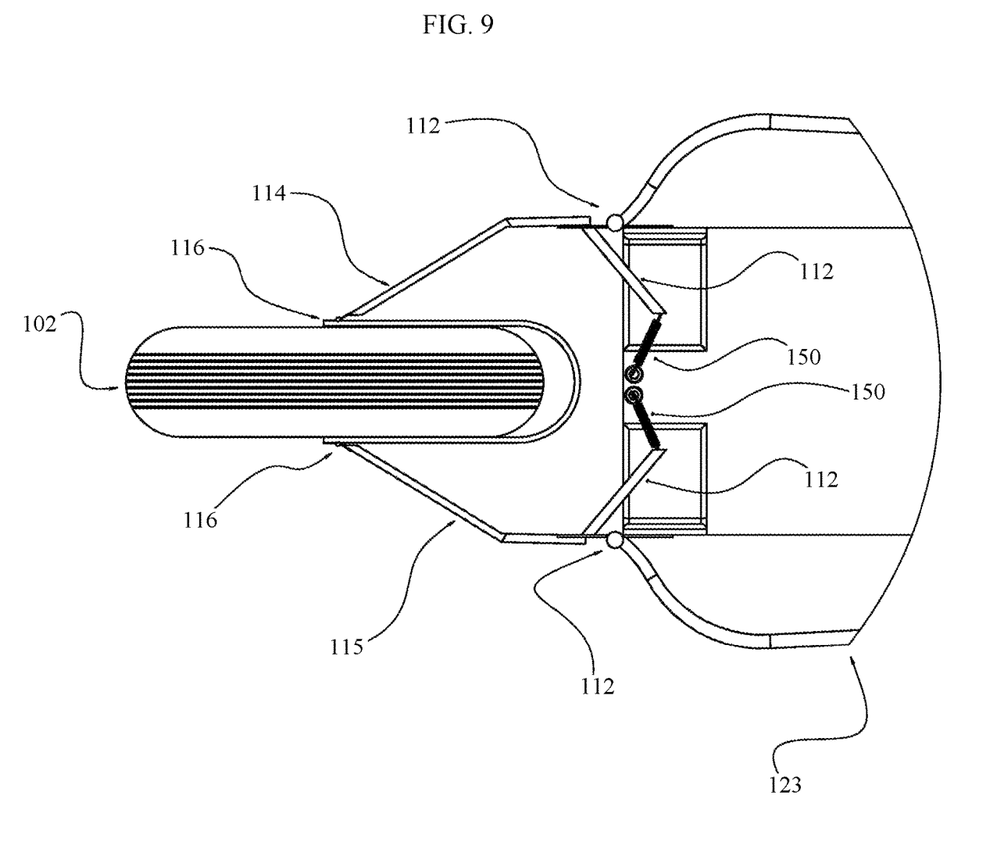
FIG. 9 illustrates a detail top view of an exemplary embodiment of the steering wheel assembly of the skateboard assembly.
Figure 10:
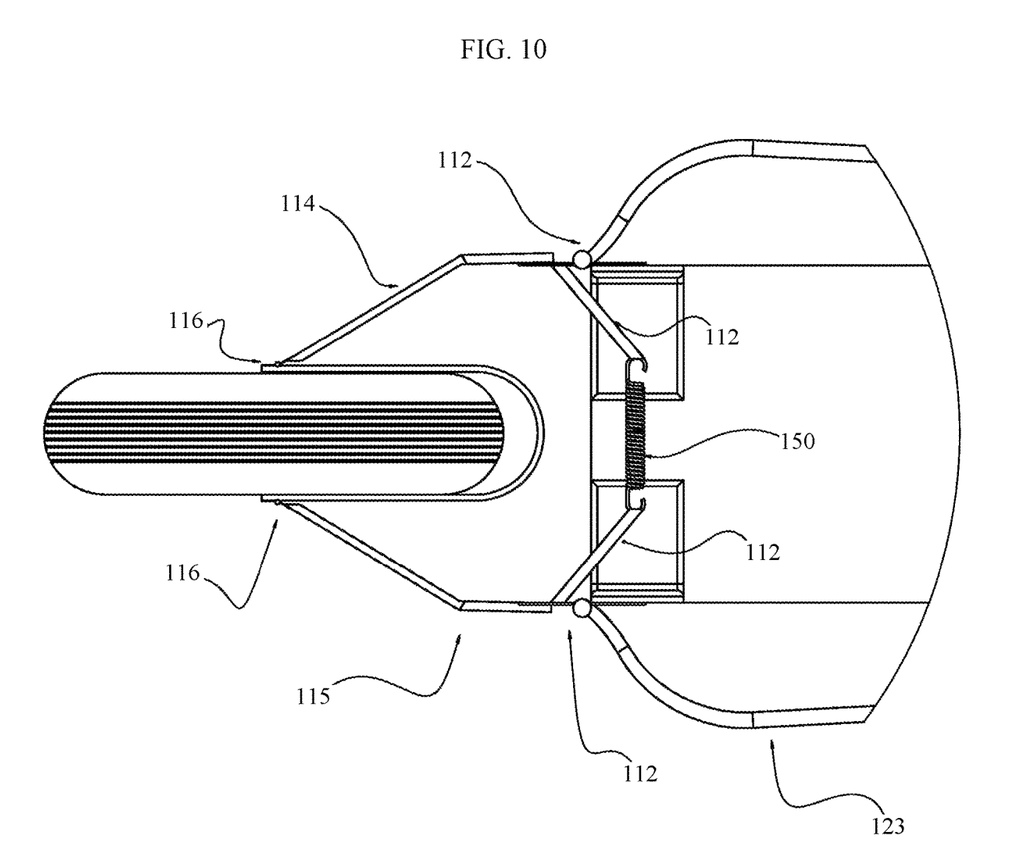
FIG. 10 illustrates a detail top view of an exemplary embodiment of the steering wheel assembly of the skateboard assembly.

Alternately, as shown in FIG. 9 and FIG. 10, the steered wheel brackets 128 can be removed and at least one spring 126 can be removed. Spring 150 can be attached to first end hinge 112 and second end hinge 112.

FIG. 2 conceptually illustrates an electronic system 200 with which some embodiments of the invention are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a network 240.

The bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225.

From these various memory units, the processing unit(s) 210 retrieves instructions to execute and data to process in order to execute the processes of the invention. The processing unit(s) may be a single processor or a multi-core processor in different embodiments.

The read-only-memory (ROM) 220 stores static data and instructions that are needed by the processing unit(s) 210 and other modules of the electronic system. The permanent storage device 225, on the other hand, is a read-and-write memory device. This device is a non-volatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike storage device 225, the system memory 215 is a volatile read-and-write memory, such as a random access memory. The system memory 215 stores some of the instructions and data that the processor needs at runtime. In some embodiments, the invention's processes are stored in the system memory 215, the permanent storage device 225, and/or the read-only 220. For example, the various memory units include instructions for processing appearance alterations of displayable characters in accordance with some embodiments. From these various memory units, the processing unit(s) 210 retrieves instructions to execute and data to process in order to execute the processes of some embodiments.

The bus 205 also connects to the input and output devices 230 and 235. The input devices enable the person to communicate information and select commands to the electronic system. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD). Some embodiments include devices such as a touchscreen that functions as both input and output devices.

Finally, as shown in FIG. 2, bus 205 also couples electronic system 200 to a network 240 through a network adapter (not shown). In this manner, the computer can be a part of a network of computers (such as a local area network ("LAN"), a wide area network ("WAN"), or an intranet), or a network of networks (such as the Internet). Any or all components of electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A skateboard assembly, configured to be self-propelled and manually steered; the skateboard assembly comprising:
    a board having a top side, a bottom side, a flat and a rounded end; wherein a centerline joins a flat end center point and a rounded end center point;
    a steered wheel assembly, joined to the board and comprising:
        a first linkage, joined to a top side first end with a top side first end hinge;
        a first bracket attached to the first hinge and the board;
        a second linkage, joined to a top side second end with a top side second end hinge;
        a second bracket attached to the second hinge and the board;
        a steered wheel, joined to the first linkage with a first wheel hinge and joined to the second linkage with a second linkage hinge;
        a steered wheel bracket, attached to the steered wheel and further joined to the top side with a spring;
        a steered tire, surrounding the steered wheel;
        wherein altering pressure between the top side first end and the top side second end causes the steered wheel to turn, thus manually steering the board;
    a driven wheel assembly, joined to the board and comprising:
        a driven wheel, attached to the board;
        a driven tire, surrounding the driven wheel
        a gear attached to the driven wheel;
        a drive assembly, attached to the gear;
        wherein the drive assembly turns the driven wheel making the skateboard assembly self-propelled;
    an input device.

2. The skateboard assembly of claim 1, wherein the first bracket and the second bracket are attached to the top side.

3. The skateboard assembly of claim 1, wherein the first bracket and the second bracket are attached to the bottom side.

4. The skateboard assembly of claim 1, wherein the board is a multi-ply wooden skateboard deck.

5. The skateboard assembly of claim 4, further comprising an opening arranged through the board between the top side and the bottom side proximate the rounded end; wherein the driven wheel is arranged in the opening.

6. The skateboard assembly of claim 5, wherein the multi-ply wooden skateboard deck has a structurally significant portion of the board retained at the rounded end directly behind the driven wheel to maintain torsional stiffness of the multi-ply wooden skateboard deck for mounting the driven wheel.

7. The skateboard assembly of claim 1, wherein the board is a made from one member selected from a material set consisting of: a metal, a composite material, and a structural tubing.

8. The skateboard assembly of claim 1, wherein the drive assembly further comprises:
    a motor, attached to the gear with a chain and
    a battery attached to the motor.

9. The skateboard assembly of claim 8, wherein the battery is selected from one member of a battery set consisting of: a lithium-ion battery, a nickel metal hydride battery, a nickel-cadmium cell battery, capacitor energy storage pack, and a mechanical energy storage.

10. The skateboard assembly of claim 8, wherein the input device controls at least one of a control set consisting of: amperage, voltage, gear, and polarity.

11. The skateboard assembly of claim 1, wherein the drive assembly further comprises an internal combustion engine.

12. The skateboard assembly of claim 1, wherein the first linkage and the second linkage are cantilevered off of the rounded end of the board.

13. The skateboard assembly of claim 1, further comprising:
    a first beam, attached to the bottom side and to the top side first end hinge through the board;
    a second beam, attached to the bottom side and to the top side second end hinge through the board;
    wherein the first beam and the second beam provide additional structural support to the first linkage and the second linkage.

14. The drive assembly of claim 1, wherein the drive assembly is attached to the gear with one member of an attachment set consisting of: a chain, a belt, and a hub motor.

15. The skateboard assembly of claim 1, wherein the input device may consist of at least one of the following: a mouse, RC controller, handheld remote, watch, mobile cellular device, computer, Bluetooth device, trackball, track pad, joystick, game controller, stylus, touch screen, multi-touch screen, microphone to capture voice or other sound input, or video camera or other sensor to capture motion, gesture, or visual input.

* * * * *